(No Model.)
A. A. LONG.
PNEUMATIC TIRE.
No. 539,586.   Patented May 21, 1895.
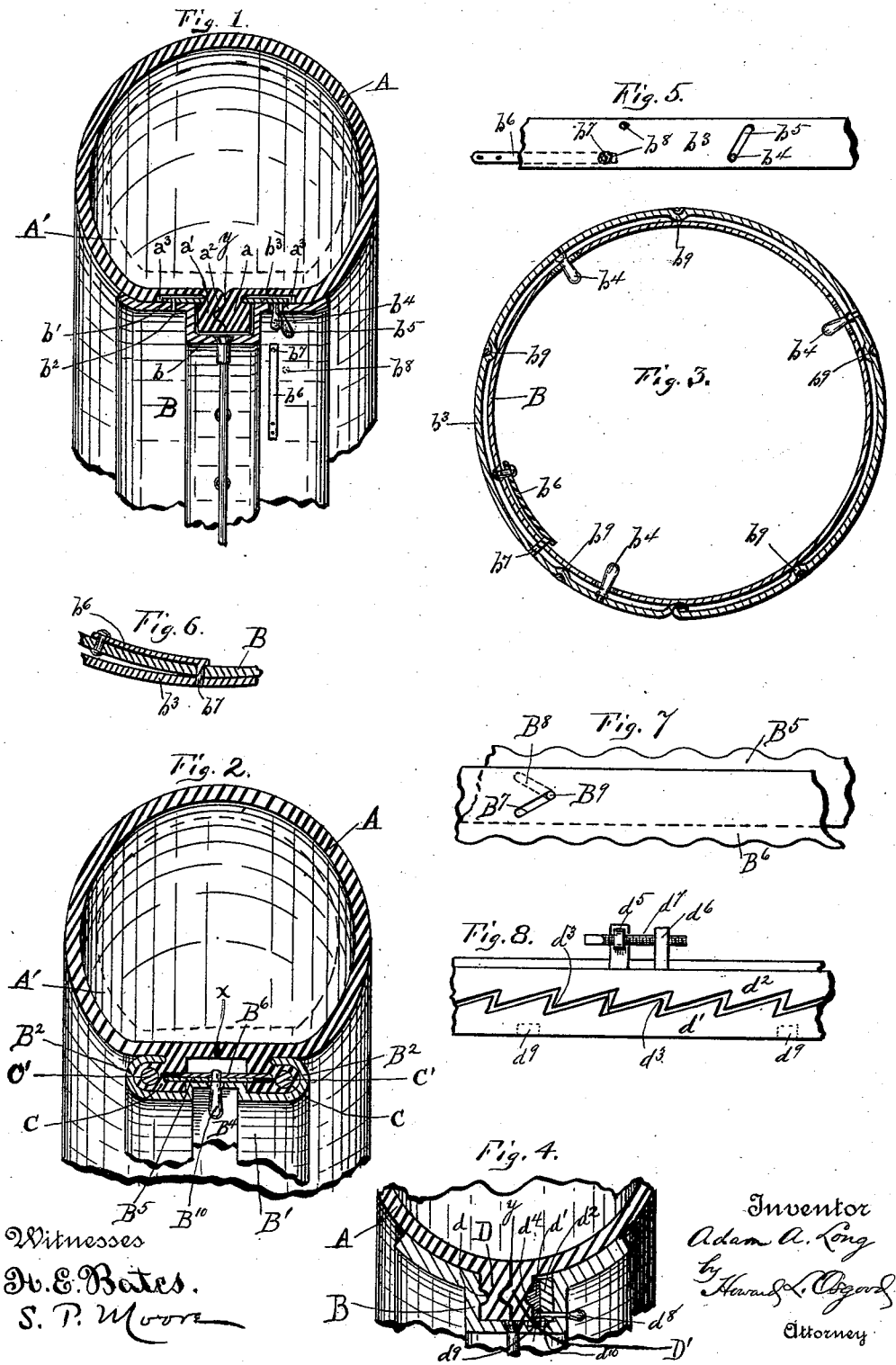
Witnesses
H. E. Bates.
S. P. Moore
Inventor
Adam A. Long
by Harvey L. Osgood
Attorney

UNITED STATES PATENT OFFICE.

ADAM A. LONG, OF ROCHESTER, NEW YORK.

PNEUMATIC TIRE.

SPECIFICATION forming part of Letters Patent No. 539,586, dated May 21, 1895.

Application filed January 18, 1894. Serial No. 497,315. (No model.)

*To all whom it may concern:*

Be it known that I, ADAM A. LONG, a citizen of the United States, and a resident of the city of Rochester, in the county of Monroe and State of New York, have invented certain new and useful Improvements in Pneumatic Tires, of which the following is a specification, reference being had to the accompanying drawings, in which—

Figure 1 is a transverse sectional view of one of my tires. Fig. 2 is a transverse sectional view of another form. Fig. 3 is a vertical section through the felly and sliding band. Fig. 4 is a transverse section of part of one of my tires. Figs. 5, 6, 7, and 8 are views of details.

The object of my invention is to provide a pneumatic tire which is held in position on the felly by positive clamping and releasing mechanism in order that it may be easily removed and put in place; and also to provide a pneumatic tire which may be used with or without an inner tube.

In the drawings A represents an india rubber tube adapted for inflation, or the same may represent the usual outer shoe used in pneumatic tires, in which case an inner tube, indicated by the dotted lines marked A' in Figs. 1 and 2, is used with the tube marked A.

In the form of my device shown in Fig. 1 the split tube or tire A has formed upon its edge two ribs $a\ a'$. Longitudinally on the inner side of the rib $a$ is a protuberance $a^2$ which fits into a corresponding recess in the rib $a'$. The protuberance and recess extend all the way around the ribs of the tire.

The felly B has a recess $b$ slightly larger in cross-section than the area, in cross-section, of the ribs $a\ a'$ when they are set together in the position shown in Fig. 1, and is of sufficient depth to contain said ribs. On one side of this recess $b$, a band of metal $b'$ is fastened firmly to the felly as by rivets $b^2$, and the edge of the band projects over the recess $b$ to a slight extent. On the other side of the recess $b$ a continuous band $b^3$ extends all around the felly. The bands $b'\ b^3$ set into recesses formed in the tire A. The recess $a^3$ locks the movable band in place when the tube A is inflated. At suitable points around the felly diagonal slots $b^5$ are cut through the same, and through these slots pass pins $b^4$ which are fastened into the band $b^3$. By these means if the pins $b^4$ are moved in the slots, the band $b^3$ will slide around upon the felly B, and at the same time will slide inward or outward, according to the direction of its motion, to or from the stationary band $b'$. A spring $b^6$, fastened to the felly, bears a pin $b^7$ which projects through a hole in the felly and enters into one or the other of two holes $b^8$ in the band $b^3$, which holes correspond to the two limits of motion of the pins $b^4$ in the slots $b^5$, so that when the pin $b^7$ rests in one or the other of said holes the band $b^3$ is locked in one or the other of its extreme positions. Of course the same effect is produced by forming the slots $b^5$ in the band $b^3$ and fastening the pins $b^4$ to the felly.

When the band $b^3$ is in the position shown in Fig. 1, the tire A is tightly clamped between it and the band $b'$, and, on account of the formation of the ribs $a\ a'$ and the fitting of the protuberance $a^2$ into its corresponding recess, the tire A will be tightly locked upon the felly B, and so tightly that the joint between the two ribs $a\ a'$ will be air-tight.

Any suitable anti-friction device may be used, if preferred, to produce ease of motion of the band $b^3$, such as the indentations $b^9$ shown in Fig. 3.

In the form of tire shown in Fig. 1 the stationary plate $b'$ may be made movable like the band $b^3$. In other words, one or both of the bands may be made movable.

In the form of my device shown in Fig. 2 the tire A has separated ribs C C which fit into a felly B' having its outer edges curved inward toward the center to form recesses B² for the ribs. Along the middle line of the felly is a raised surface B⁴ and upon this surface slide two bands B⁵ B⁶, each of which bands has a series of parallel diagonal slots B⁷ B⁸; the slots in the one band being at similar but opposite angle to the medial line, as shown in Fig. 7. A series of stationary pins B⁹ are fixed in the felly and project through each pair of slots. The inside plate B⁵ has one or more pins or handles B¹⁰ fastened to it which project through slots in the felly, so that when the pin is moved the bands slide in opposite directions one upon the other. Recesses may be made in the ribs C C into which the bands B⁵ B⁶ project when the same are moved apart, and when so moved apart they clamp the ribs C C tightly in the felly. A series of stiffening pieces C' C', preferably discontinuous, which are set in the ribs C C, are used to prevent too great flexibility in the tire in the process of setting the same in the felly.

The tire shown in Fig. 2 may or may not be split upon the line indicated by $x$. The clamping edges of the bands may be corrugated or roughened as shown in Fig. 7 to hold the tire more firmly and to prevent it from creeping around the felly.

In the form of device shown in Fig. 4 the tire A has ribs D D' similar to those shown in Fig. 1 and a felly of like form is used, except that on one side of the recess $b$ is a rib $d$ extending all the way around the felly. On the opposite side of the recess are two continuous bands $d'$ $d^2$ arranged vertically with reference to the felly and provided on their contiguous faces with a series of corresponding saw-like teeth $d^3$. Shown much enlarged in Fig. 8. The band $d'$ is fastened to the felly as by lugs $d^9$, setting in transverse recesses $d^{10}$ in the felly so that the band $d'$ shall move directly to and from the rib D' without sliding on it. The other band $d^2$ slides around upon the face of the band $d'$, and, on account of the wedge action of the teeth $d^3$, forces the band $d'$ inward and outward from the middle line of the recess $b$, thus clamping the ribs D D' between it and the opposite side of the recess $b$, or releasing the same. The band $d'$ has a rib $d^4$ similar to the rib before mentioned and the band $d^2$ is provided with handles $d^8$ projecting through the felly. Means are provided for moving them apart and thus sliding one of said bands upon the other to clamp the tire, as before described. This may be done in various ways, as by a right and left screw $d^7$, as shown in Fig. 8, operating lugs $d^5$ and $d^6$ fastened to the bands, or by devices similar in mechanism to the devices shown in Figs. 1, 3, 5 and 6. This form of tire is split on the line $y$ and is made airtight in the same way as that shown in Fig. 1, or in both cases the ribs $a$ $a'$ and D D' may be made in one piece and the tire is not split.

The ribs $a$ $a'$ of Fig. 1, C C' of Fig. 2, and D D' of Fig. 4, may in each case be considered as a single rib which may be split or not as desired, for so far as holding the tire in the rib is concerned, it is immaterial whether the rib is split or integral and unsplit.

What I claim is—

1. In a pneumatic tire, a recessed felly, an inflation tube or a tire having a rib formed to rest in the recess in said felly, a transversely movable clamping plate or band extending around the felly whereby the rib is clamped within the recess and to the felly, and positive mechanism attached to the felly for positively moving the whole of said band at the same time both to clamp and to release said rib.

2. In a pneumatic tire, a recessed felly, an inflation tube or a tire having a rib formed to rest in the recess in said felly, two transversely movable clamping plates or bands extending around said felly whereby the rib is clamped by said plates or bands within the recess and to the felly, and a positive mechanism for both spreading and drawing together said bands and actuating the whole of one or each of said bands at the same time.

3. In a pneumatic tire, a recessed felly, an inflation tube or a tire having a rib formed to rest in the recess in said felly, two transversely movable clamping plates or bands extending around said felly whereby the rib is clamped by said plates or bands within the recess and to the felly, and a positive mechanism for both spreading and drawing together said bands, and actuating the whole of one or each of said bands at the same time, and means for locking said bands.

4. In a pneumatic tire, a recessed felly, an inflation tube or tire having a rib formed to rest in the recess in said felly, two transversely movable clamping plates or bands extending around said felly whereby the rib is clamped by said bands within the recess and to the felly, and means for moving one or both of said bands, both transversely and circularly around the felly whereby the same move diagonally to clamp said rib.

5. In a pneumatic tire, a recessed felly, an inflation tube or tire having a rib formed to rest in the recess in said felly, a plate or band extending around said felly and movable both transversely across the felly and circularly around the felly whereby a diagonal movement is obtained and the rib is clamped within the recess and to the felly.

6. In a pneumatic tire, a recessed felly, an inflation tube or tire having a rib formed to rest in the recess in said felly, a plate or band extending around said felly and movable both transversely across the felly and circularly around the felly whereby a diagonal movement is obtained and the rib is clamped within the recess and to the felly, and means for positively moving said band to clamp and to release said rib.

7. In a pneumatic tire, a recessed felly, an inflation tube or tire having a rib formed to rest in the recess in said felly, a plate or band extending around said felly and movable both transversely across the felly and circularly around the felly whereby a diagonal movement is obtained and the rib is clamped within the recess and to the felly, and a locking device for said band.

8. In a pneumatic tire, a recessed felly, an inflation tube or tire having a rib formed to rest in the recess in said felly, a plate or band extending around said felly and movable both transversely across the felly and circularly around the felly whereby a diagonal movement is obtained and the rib is clamped within the recess and to the felly, and positive mechanism for separating and drawing together said bands.

9. In a pneumatic tire, a recessed felly, an inflation tube or tire having a rib formed to rest in the recess in said felly, a plate or band extending around said felly and movable both transversely across the felly and circularly around the felly whereby a diagonal movement is obtained and the rib is clamped within the recess and to the felly, and means for locking said bands.

10. In a pneumatic tire the combination of a tube having a rib of solid material split in the medial plane thereof, said rib being provided on the meeting faces of the two split portions thereof with the rib $a^2$ and the groove $a'$, a recessed felly, a band or bands extending around said felly for clamping the said meeting faces together, and a mechanism for positively separating and drawing together said bands, whereby, when said meeting faces are clamped together, the said tube is made air tight.

11. In a pneumatic tire, a recessed felly, a split tube having two ribs on its meeting edges, one formed to set into the other and both formed to set into the recessed felly, two clamping bands extending around the felly, one or both adapted to move transversely to and from said ribs and to clamp said ribs, and means for locking the bands with reference to each other, substantially as described.

ADAM A. LONG.

Witnesses:
S. P. MOORE,
H. L. OSGOOD.